June 2, 1931.  C. O. WOOD  1,808,277
MINE LOCOMOTIVE
Filed March 6, 1929
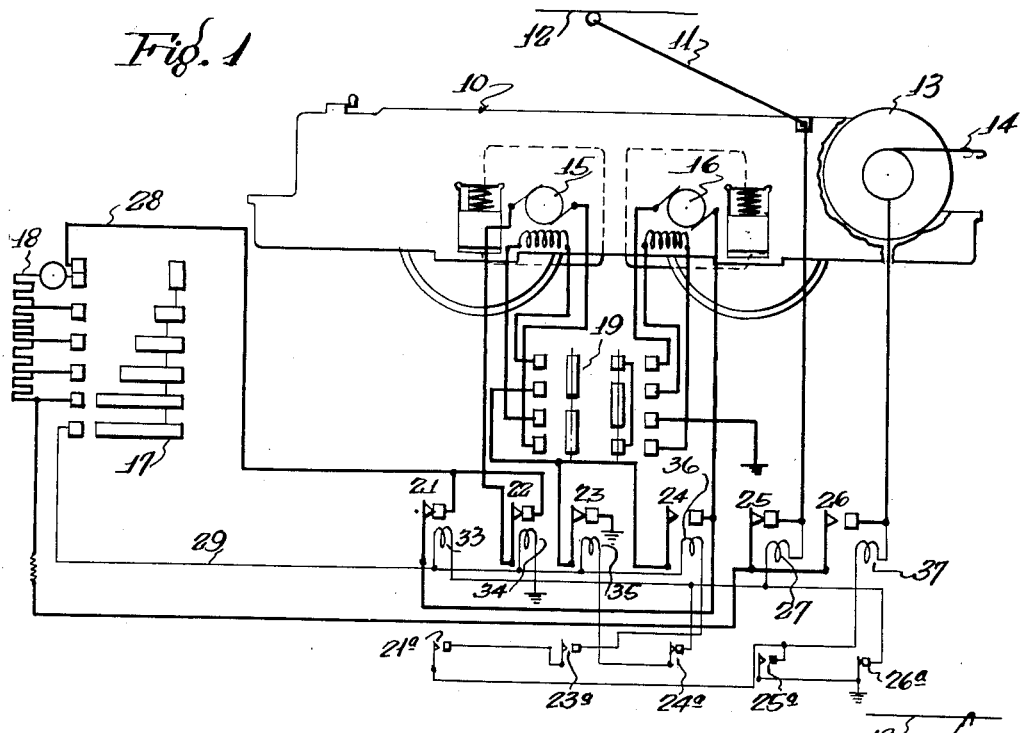
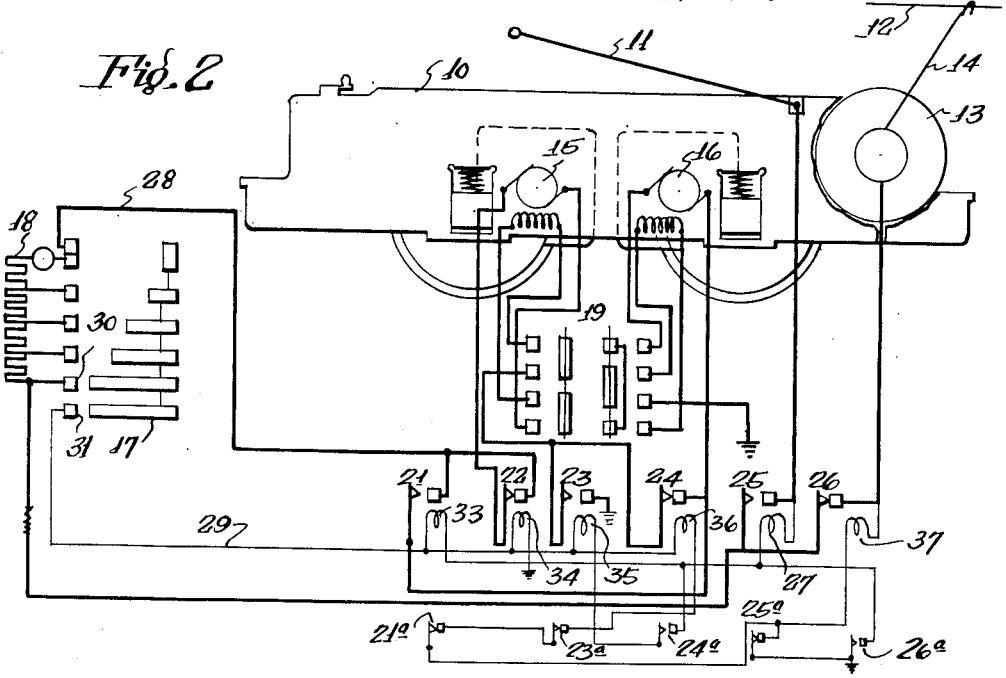
Inventor
Claude O. Wood
Clarence F. Poole
Attorney Patented June 2, 1931

1,808,277

UNITED STATES PATENT OFFICE

CLAUDE O. WOOD, OF CHICAGO, ILLINOIS, ASSIGNOR TO GOODMAN MANUFACTURING COMPANY, OF CHICAGO, ILLINOIS, A CORPORATION OF ILLINOIS

MINE LOCOMOTIVE

Application filed March 6, 1929. Serial No. 344,631.

This invention relates to improvements in mine locomotives and more particularly to combined trolley and reel gathering locomotives in which the locomotive may be operated selectively by power obtained through the trolley or through a gathering reel of the usual type having a conductor cable wound thereon and adapted to be detachably connected to the power lines in a main transportation entry while the locomotive is being operated over unwired tracks extending into remote portions of a mine.

The principal object of this invention is to provide an electrically operated means to transfer from one power inlet to another and to prevent current passing through one power inlet while the other is in use, and to provide an automatic electrically operated means for connecting a plurality of motors in parallel when the trolley is connected to the source of power and in series when the cable reel is connected to the source of power with an interlocking means to prevent the connection of the motors in series and parallel at the same time should both the reel and trolley be simultaneously connected to the source of power.

My invention may be more clearly understood with reference to the accompanying drawings, wherein:

Figure 1 is a diagrammatic view of an electric mine locomotive showing one embodiment of my invention with the motors connected to the source of power supply through a trolley; and Figure 2 is a diagrammatic view of the electric mine locomotive shown in Figure 1 with the motors connected to the source of power supply through a cable reel.

Like numerals refer to like parts throughout the various figures.

In the drawings, 10 indicates an electric locomotive of the gathering type having a trolley 11 connectible with a source of power supply 12 and a cable reel 13 having a cable 14 wound thereon connectible with said source of power. Motors 15 and 16 are provided as a source of motive power for the locomotive and are controlled by means of a manually operated controller of the ordinary drum type which includes a controller or starting drum 17 for cutting out a resistance 18 for starting the motors and a reverse drum 19 for reversing the direction of rotation of the motors 15 and 16.

A plurality of electrically operated contactors numbered from 21 to 26 inclusive are provided to transfer the power connection from the trolley to the cable reel and vice-versa and connect the motors in parallel when the trolley 11 is connected to the source of power or connect the motors in series when the cable 14 is connected to the source of power. Contactors 21 to 26, inclusive, are biased to open position. Contactor 21 connects the motor 15 in parallel with the motor 16. Contactor 22 connects the motor 15 with the controller drum 17. Contactor 23 connects the motor 15 to the return line or ground when the motors 15 and 16 are connected in parallel. Contactor 24 is provided to connect the motor 15 in series with the motor 16. Contactor 25 is provided to connect or disconnect the trolley 11 with the controller drum 17 and contactor 26 connects or disconnects the cable 14 with the controller drum 17.

Auxiliary contactors 21$^a$, 23$^a$, 24$^a$, 25$^a$, and 26$^a$ are mechanically interconnected with the contactors 21, 23, 24, 25 and 26, respectively, so as to open when the respective contactor to which the auxiliary contactor is mechanically connected closes and vice-versa. These auxiliary contactors are of an ordinary design well known to those familiar with the art and are mechanically interconnected with the electrical contactors in an ordinary manner which is not herein described or shown in detail since it is no part of my invention.

Referring now in particular to Figure 1 which shows the trolley 11 connected to the source of power 12, current passes through the trolley 11 and a contactor operating coil 27 through the auxiliary contactor 26$^a$ to ground to complete the electrical circuit through the coil 27. This energizes the contactor operating coil 27 and closes the contactor 25 completing the circuit to the controller drum 17. The controller drum 17 being turned to an 'on' position, current passes through said controller drum to a conductor 28 and through the conductor 28 to the contactors 21 and 22. An auxiliary conductor 29 is connected to the controller drum 17 through contacts 30 and 31 and carries current to contactor operating coils 33, 34, 35 and 36 to energize said coils when the respective auxiliary contactors are closed to complete the circuit to the return line or ground. Current passing through the auxiliary conductor 29 passes through the contactor operating coil 33 and through the auxiliary contactor 26ª to ground and thus energizes the coil 33 which closes the contactor 21 and thus connects the motors 15 and 16 in parallel.

The motor 15 is connected to the main line through the conductor 28 when the coil 34 is energized by current passing through the auxiliary conductor 29 through the contactor operating coil 34 to ground. Similarly contactor 23 is closed to connect the motor 15 to the return line by means of the contactor operating coil 35 which is energized when the circuit from the auxiliary conductor 29 is completed through the auxiliary contactors 24ª and 26ª. Since the auxiliary contactors 21ª and 23ª are mechanically interconnected with the contactors 21 and 23 so as to remain open when said contactors are closed the circuit through the contactor operating coil 36 remains open while the contactors 21 and 23 are closed and thus prevents the contactor 24 from closing when the contactors 21 and 23 are closed.

A contactor operating coil 37 is provided to close the contactor 26. Normally when the cable 14 is disconnected from the source of power, current will not pass through said contactor operating coil, but it may be seen that if the cable 14 should be connected to the source of power 12 while the trolley 11 is connected to said source of power that current could not get to the main line and controller drum 17 from said cable since the circuit through the contactor operating coil 37 cannot be closed as long as the contactors 21 and 25 are closed due to the fact that the auxiliary contactors 21ª and 25ª are always open when the contactors 21 and 25 are closed. This therefore provides a means whereby current may be transmitted to the controller drum 17 through either the trolley 11 or cable 14 but may not be transmitted to said controller drum through both the trolley 11 and cable 14 at the same time.

It may here be seen that I have provided a means whereby the motors 15 and 16 are prevented from being connected in series when the trolley 11 is connected to the source of power 12, said interlocking means also so interlocking the circuit from the trolley 11 or cable 14 that the circuit to the motors 15 and 16 can not be completed through the cable 14 when the trolley 11 is connected to the source of power 12 and vice-versa.

Figure 2 shows the cable 14 connected to the source of power 12 and the trolley 11 disconnected therefrom. When the trolley 11 is disconnected from the source of power 12 the contactor 25 opens. This closes auxiliary contactor 25ª so that current passing from the cable 14 passes through the contactor operating coil 37 and through the auxiliary contactor 25ª to ground and energizes said contactor operating coil to close the contactor 26 and allow current to flow to the controller drum 17. When the contactor 26 closes, the auxiliary contactor 26ª opens and thus opens the circuit from the conductor 29 through the contactor operating coils 33 and 27 to prevent closing of the contactors 21 and 25 and prevent the motors 15 and 16 from being connected in parallel or connected to the trolley 11. Current flowing through the auxiliary conductor 29 excites the contactor operating coil 34 which closes the contactor 22 and connects the motor 15 to the conductor 28. Current flowing through the contactor operating coil 36 and the auxiliary contactors 23ª, 21ª and 25 to ground excites said coil to close the contactor 24 and thus connect the motor 15 in series with the motor 16. Since the contactor 24 is closed the auxiliary contactor will be open so that the circuit through the contactor operating coil 35 will be open to allow the contactor 23 to remain open and disconnect the motor 15 from the return line.

It may here be seen that the motors 15 and 16 are obtaining power through the cable reel 13 and cable 14 and are connected in series and that the connections to said motors from the cable 14 are so interlocked that they may only be operated in series from the cable 14 and that it is not possible to obtain current through the trolley 11 should said trolley be connected to the same source of power after the cable 14 has been connected to said source of power. It may also be seen that the interlocking system herein provided is so arranged that it connects the locomotive motors to either the trolley or reel cable depending upon which is first connected to the source of power and that when the locomotive motors are connected to one source of power that they may not simultaneously be connected to both sources of power.

It may now be seen that I have provided new and novel means for connecting a plurality of locomotive motors in parallel when operated from the trolley on long hauls and pulling heavy loads and in series when operated from the cable reel on short hauls pulling relatively light loads over rough track, and have provided a fool proof interlocking means to insure that the locomotives are connected together in the aforementioned manner at all times.

Since electric power is more evenly distributed between the locomotive motors when connected in parallel than in series, and since said motors will operate at a higher rate of speed when connected together in parallel than in series it is particularly advantageous that said motors be connected in parallel when operated from the trolley where the hauls are long and the loads are heavy and that said motors be connected together in series when operated from the cable reel where the hauls are short and the loads are light and the track is rough and uneven and must be negotiated at a slow rate of speed.

Although I have shown and described one form in which my invention may be embodied, it will be understood that the arrangement of the various parts and the construction thereof may be altered or changed without departing from the spirit or scope of the invention. Furthermore, I do not wish to be construed as limiting myself to the specific embodiment illustrated, excepting as it may be limited by the appended claims.

I claim as my invention:

1. In a locomotive having a plurality of driving motors and trolley and reel inlets for power supply to said motors, automatic devices for connecting the locomotive motors in series or parallel circuits, depending upon whether the trolley or reel inlet is utilized for connection to a power source.

2. In combination with a gathering locomotive, a plurality of motors connectible together in series or parallel circuits, a trolley and a cable reel, automatic electrically operated means for connecting said motors to a source of power through said trolley or cable reel, said automatic electrically operated means also providing a means for automatically connecting said motors together in a parallel circuit when connected to the source of power through said trolley and connecting said motors together in a series circuit when connected to the source of power through said cable reel.

3. In combination with a gathering locomotive, a plurality of motors connectible together in series or parallel circuits, a trolley and a cable reel, and means automatically connecting said motors together in a parallel circuit when connected to the source of power through said trolley and connecting said motors together in a series circuit when connected to the source of power through said cable reel.

4. In combination with a gathering locomotive, a plurality of motors connectible together in series or parallel circuits, a trolley and a cable reel, means automatically connecting said motors together in a parallel circuit when connected to the source of power through said trolley and connecting said motors together in a series circuit when connected to the source of power through said cable reel, and electrically operated interlocking means to prevent said motors from being connected to the source of power through said cable reel when connected to the source of power through said trolley.

5. In combination with a gathering locomotive, a plurality of motors connectible together in series or parallel circuits, a trolley and a cable reel, means automatically connecting said motors together in a parallel circuit when connected to the source of power through said trolley and connecting said motors together in a series circuit when connected to the source of power through said cable reel, electrically operated interlocking means to prevent said motors from being connected to the source of power through said cable reel when connected to the source of power through said trolley, and electrically operated interlocking means to prevent said motors from being connected to the source of power through said trolley when connected to the source of power through said cable reel.

6. In combination with a gathering locomotive, a plurality of motors connectible together in series or parallel circuits, a trolley and a cable reel, means automatically connecting said motors together in a parallel circuit when connected to the source of power through said trolley and connecting said motors together in a series circuit when connected to the source of power through said cable reel, and electrically operated interlocking means for preventing said motors from being connected to the source of power through said reel when connected to the source of power through said trolley, or preventing said motors from being connected to the source of power through said trolley when connected to the source of power through said reel.

7. In combination with a gathering locomotive, a plurality of motors connectible together in series or parallel circuits, a trolley and a cable reel, means automatically connecting said motors together in a parallel circuit when connected to the source of power through said trolley and connecting said motors together in a series circuit when connected to the source of power through said cable reel, electrically operated interlocking means for preventing said motors from being connected to the source of power through said reel when connected to the source of power through said trolley or preventing said motors from being connected to the source of power through said trolley when connected to the source of power through said reel, said electrically operated interlocking means also providing a means to prevent said motors from being connected together in series when the trolley is connected to the source of power or to prevent said motors from being connected in parallel when connected to the source of power through said reel.

8. In combination with a gathering locomotive, a plurality of motors connectible together in series or parallel circuits, a trolley, a cable reel, a plurality of electrically operated contactors for automatically connecting said motors to a source of power through said trolley or cable reel, a plurality of auxiliary contactors for controlling the operation of said first mentioned contactors, said first mentioned contactors also providing means for automatically connecting said motors together in a parallel circuit when connected to the source of power through said trolley and connecting said motors together in a series circuit when connected to the source of power through said cable reel.

9. In combination with a gathering locomotive, a plurality of motors, a trolley, a cable reel, a plurality of electrically operated contactors for automatically connecting said motors to a source of power through said trolley or cable reel, an auxiliary circuit for operating said contactors, a plurality of auxiliary contactors in said auxiliary circuit for controlling the operations of said first mentioned contactors, each of said auxiliary contactors being connected to one of said first mentioned contactors so as to open the auxiliary circuit when said electrically operated contactor to which it is connected closes the main line circuit or closes the auxiliary circuit when its respective electrically operated contactor opens, said contactors also providing a means for automatically connecting the motors in parallel when connected to the source of power through the trolley and connecting the motors in series when connected to the source of power through the cable reel.

Signed at Chicago, in the county of Cook and State of Illinois, this 28th day of February, A. D. 1929.

CLAUDE O. WOOD.